July 12, 1966 — W. MÜLLER — 3,260,978

INTERLEAVED WINDING ARRANGEMENT FOR ELECTRICAL APPARATUS

Filed Aug. 30, 1963

WITNESSES

INVENTOR
Walter Müller
BY
ATTORNEY

United States Patent Office 3,260,978
Patented July 12, 1966

3,260,978
INTERLEAVED WINDING ARRANGEMENT FOR ELECTRICAL APPARATUS
Walter Müller, Nurnberg, Germany, assignor to Siemens-Schuckwertwerke Aktiengesellschaft, Erlangen, Germany, a corporation of Germany
Filed Aug. 30, 1963, Ser. No. 305,795
Claims priority, application Germany, Sept. 5, 1962, S 81,279
1 Claim. (Cl. 336—187)

This invention relates in general to electrical inductive apparatus such as transformers, and more particularly to cylindrical windings known in the art as interleaved wound pancake coils.

Some interleaved windings of the prior art have had the disadvantage of internal connections in the pancakes or in the spaces between pancakes. These internal connections between pancakes add to the complexity of constructing the winding. Then too, it is desirable to have an interleaved cylindrical pancake winding in which the potential difference between adjacent turns is as small as possible.

Accordingly, it is a general object of this invention to provide a new and improved interleaved cylindrical winding for electrical inductive apparatus.

It is a more particular object of this invention to provide a new and improved interleaved cylindrical winding which has two parallel paths through the winding.

It is yet another object of this invention to provide an interleaved cylindrical winding in which all the connections between pancakes are located on the surfaces of the winding cylinder.

Briefly, the present invention accomplishes the above cited objects by winding each pancake with at least two strands of conductors so that the pancake turns alternate radially from one strand to another, and then interconnecting the pancake strands in a novel manner so that two parallel paths are formed through the winding. The direction of the paths changes from pancake to pancake. The pancake strands are interconnected into what I shall call wave and loop connections or modes.

By a wave connection it should be understood to mean a connection between pancakes which results in a series circuit which goes through a first pancake via one strand in one direction and then through a second pancake via one strand in the opposite direction. As many pancakes as desired may be linked in this manner. The connections between pancakes are made on the surface of the windings.

By a loop connection it will be understood that I mean an interconnection of pancake strands between pancakes in such a manner that, after the connection is made, circuit continuity is such that a circuit may be traced through one pancake, other than the first, via one strand in one direction and then back to a preceding pankcake in the winding. The circuit goes through the preceding pancake in the opposite direction via one of the pancake strands and then continues past the first pancake. This forms one loop; if a second loop is desired, a connection is made past a third pancake to a fourth pancake. The circuit then goes through the fourth pancake via one strand in one direction and returns to the third pancake. After going through the third pancake in the opposite direction via one strand the circuit may continue on to other loops. It is to be noted that all connections between pancakes are made on the surface of the winding.

Further objects and advantages of the invention will become apparent as the following description proceeds and features of novelty which characterize the invention will be pointed out in particularity in the claim annexed to and forming a part of this specification.

For a better understanding of the invention, reference may be had to the accompanying drawings, in which.

It is well known to those skilled in the art of interleaved pancake windings that the single coil system of interleaving wherein a pancake is doubled back on itself has advantages; the potential difference between adjacent conductors is low and the initial voltage distribution factor $\alpha$ is also low. This factor $\alpha$ is the square root of the ratio of the ground capacity of the winding to the series capacity of the winding. One disadvantage of the single coil system is the intra-pancake connections required to double the circuit back on itself in each pancake.

The double coil system of the prior art wherein two interleaved pancakes are interconnected so that a series circuit may be traced through one conductor of the first pancake in one direction, then through one conductor of the second pancake in the opposite direction, then through the remaining conductor of the first pancake in the same direction as the first conductor of the first pancake, then through the remaining conductor of the second pancake in the same direction as the first conductor of the second pancake, has the advantage of no intra-pancake connections but the disadvantage of twice the voltage between turns as the single coil system.

My invention results in low voltage between turns as well as no intra-pancake connections.

Figure 1A:
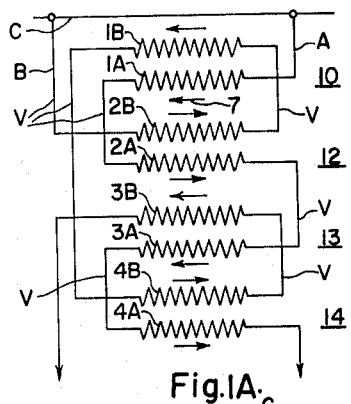
FIGURE 1A is a schematic diagram of an interleaved cylindrical pancake winding embodying the teachings of the invention.

Referring to FIGURE 1A there is illustrated schematically a cylindrical interleaved pancake winding. For simplicity, only four pancakes 10, 12, 13 and 14 are illustrated. Each pancake is wound with two interleaved conductors. For example, conductor 1B and conductor 1A are interleaved throughout pancake 10. Two input conductors A and B are supplied to the winding from a line lead C in all embodiments of the invention, which may be connected together at the termination of the winding to provide two parallel circuits through the winding. Conductor A is connected to one surface of the winding at the right-hand end of conductor 1A of pancake 10. Conductor A then continues downward through the winding in the wave mode of interconnection through strands or conductors 2A, 3A and 4A by means of connections V located on the surfaces of the winding. Conductor B enters the winding at the opposite side of the winding from conductor A. Conductor B is connected to the left-hand side of conductor 2B of pancake 12. Conductor B traverses the winding downward in two loops. A first loop is formed by traversing conductor 2B of pancake 12 in one direction, then going to pancake 10 by means of a surface connection and traversing pancake 10 in the opposite direction by means of conductor 1B. The second loop in the winding may be traced from the surface connection between conductors 1B and 4B of pancakes 10 and 14 through pancake 14 by means of conductor 4B in one direction. The circuit then goes to pancake 13 by means of a surface connection. The circuit goes through pancake 13 in the opposite direction by means of conductor 3B and then is available for connection to more pancakes or to an external circuit. The arrow close to each conductor indicates the direction of current in the conductor. For example, arrow 7 indicates the direction of current in conductor 1A of pancake 10. It will be noted that in each pancake the direction of current in each conductor is the same. In adjacent pancakes the current direction is in opposite directions. It will be understood, that the winding sense of each pancake is such that the magnetic flux produced by each pancake is additive to that produced by every other pancake.

Figure 1B:
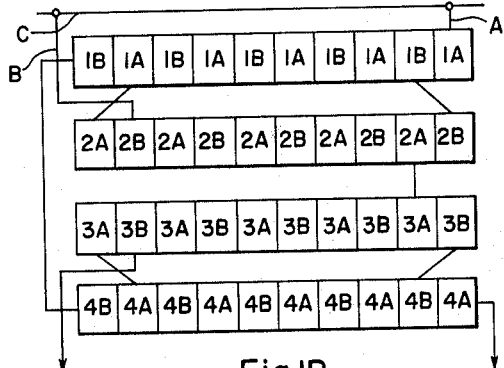
FIGURE 1B is a transverse sectional view of a portion of the interleaved cylindrical pancake winding of FIG. 1A.

In FIGURE 1B of the drawings there is illustrated a partial transverse sectional view of the interleaved conductors 1A, 2A, 3A, 4A, 1B, 2B, 3B and 4B of the cylindrical winding illustrated in FIG. 1A. The axis of the winding is parallel to the long dimension of the drawing. If it is desired to use the winding in an electrical transformer, a magnetic core (not shown) would be associated with the winding. It will be noted that the A circuit and the B circuit conductors alternate radially in each pancake of the winding. The potential difference between radially adjacent turns in each pancake is kept as low as possible. For example, assuming the voltage distribution to be linear across the winding, conductor 1A has a quarter of the potential of the winding impressed across it. Conductor 1B has one half of the winding potential between the left end of 1B and point A because conductor 1B is being fed from conductor 2B which already has passed through the winding once, picking up a quarter of the winding potential. The potential difference between conductors 1A and 1B is therefore at proximal points one-quarter of the winding potential or the potential of one pancake. This winding has the desirable impulse properties for which the interleaved type winding is known. That is, impulse voltages do not tend to concentrate in the first one or two pancakes but are distributed over the entire winding. Additionally, all interconnections between pancakes are kept out of the channels between the pancakes. This makes for a better space factor and a winding far easier to manufacture.

Figure 2A:
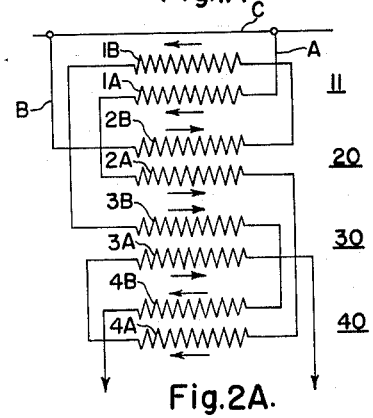
FIG. 2A is a schematic diagram of an embodiment of the invention in which each path alternates between the loop and wave connection.

Referring to FIG. 2A there is illustrated schematically a modification of my invention employing two parallel connected circuits. One circuit goes through the winding first as a loop connection between two adjacent pancakes and then as a wave connection between the next two pancakes. The second circuit goes through the winding exactly in the opposite manner than the first circuit. For example, the second circuit is wave connected in any two pancakes in which the first circuit is loop connected. In a circuit in which the first circuit is wave connected the second circuit is loop connected and so on. It will be observed that the arrows indicating current direction balance with an equal number pointed to the left and an equal number pointed to the right. As in the previous embodiment of the invention, the two parallel circuits will be referred to as the A circuit and the B circuit. Only four pancakes 11, 20, 30 and 40 are shown, but it will be understood that many more pancakes may be used without departing from the spirit and scope of the invention. The A circuit goes through the first two pancakes 11 and 20 in the wave mode and through the second two pancakes 30 and 40 in the loop mode. Conversely, the B circuit goes through the first two pancakes 11 and 20 in the loop mode and through the second pair of pancakes 30 and 40 in the wave mode. As in all embodiments of my invention, the different strands of each pancake carry current in the same direction.

Figure 2B:
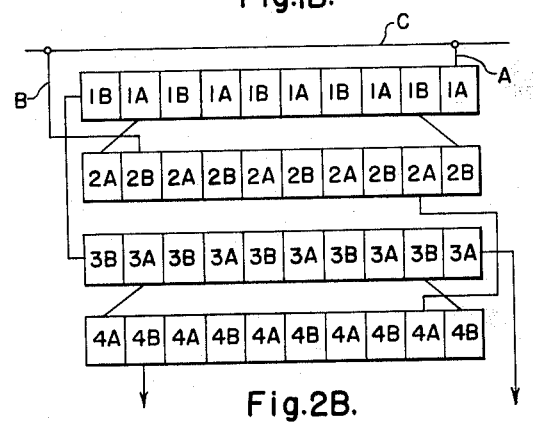
FIG. 2B is a transverse sectional view of a portion of the interleaved cylindrical pancake winding of FIG. 2A.

In FIG. 2B of the drawings one may see a partial transverse sectional view of an interleaved cylindrical winding connecting conductors 1A, 2A, 3A, 4A, 1B, 2B, 3B and 4B according to the teachings of the schematic diagram of FIG. 2A. As in FIGURE 1B it will be observed that there are no intra-pancake connections. No connections are used which traverse laterally the spaces between pancakes. The potential difference between adjacent turns in any pancake is equal to the voltage developed across one pancake. For example, the difference in potential of the turn of conductor 1A attached to line A and the turn of conductor 1B which is attached to conductor 2B will be determined. Assume, for purposes of reference, the line A to be at zero potential. The turn of conductor 1A attached to line A will also be at zero potential. The direction of the current arrows in FIG. 2A indicates that conductor 1B is being fed from conductor 2B after 2B has picked up the voltage of one pancake. The voltage between the adjacent turns in question is thus equal to the voltage across one pancake. A similar analysis holds for any other 2 adjacent turns in FIGS. 2A and 2B.

Figure 3A:
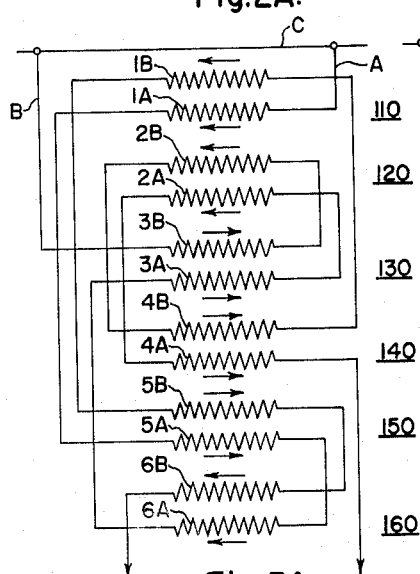
FIG. 3A is a schematic diagram of a modification of the invention illustrating a third combination of wave and loop connection of interleaved pancakes.

I have shown in FIG. 3A a third embodiment of my invention adapted to two parallel connected circuits or a multiple of two parallel connected circuits. This modification of my invention requires a winding having six pancakes or a multiple of six pancakes for perfect matching of wave and loop pairs. It will be understood that two parallel circuits or paths or a multiple of two parallel circuits or paths may be formed through the winding although for illustration but two parallel paths are shown. As in other embodiments of the invention, the winding has a combination of loops and waves.

The A circuit enters the winding at the top pancake 110 and traverses this pancake in one direction by means of conductor 1A. The A circuit then drops down to the fifth pancake 150 and loops through the fifth and sixth pancakes 150 and 160 by means of conductors 5A and 6A. The direction of the circuit changes from pancake to pancake. The A circuit then goes to the third and second pancakes 130 and 120 where it forms a loop via conductors 3A and 2A. The A circuit then goes straight through the fourth pancake 140 via conductor 4A and is now available for connection to another set of six pancakes or to an external circuit.

The B circuit enters the winding at the third pancake 130 from the top of the winding on the opposite surface of the winding from where the A circuit entered. The B circuit forms a loop with the third and second pancakes 130 and 120 via conductors 3A and 2A. The B circuit then goes straight through the fourth pancake 140 via conductor 4B where it connects to the first pancake 110. The B circuit goes straight through the first pancake 110 via conductor 1B. From the first pancake 110 the B circuit goes to the fifth and sixth pancakes 150 and 160 which are connected together in the wave mode; the B circuit traverses these two pancakes via conductors 5B and 6B. From the free end of conductor 6B, the B circuit may be connected to an external circuit or to more pancakes. As in other embodiments of the invention, the arrow closest to each of the conductors of each pancake indicates the direction of current flow. It will be noted that the current always flows in the same direction in both of the interleaved conductors of each pancake. The direction of winding of each pancake is such that the increment of the magnetic field produced by each pancake is additive to the increments of magnetic field produced by every other pancake.

Figure 3B:
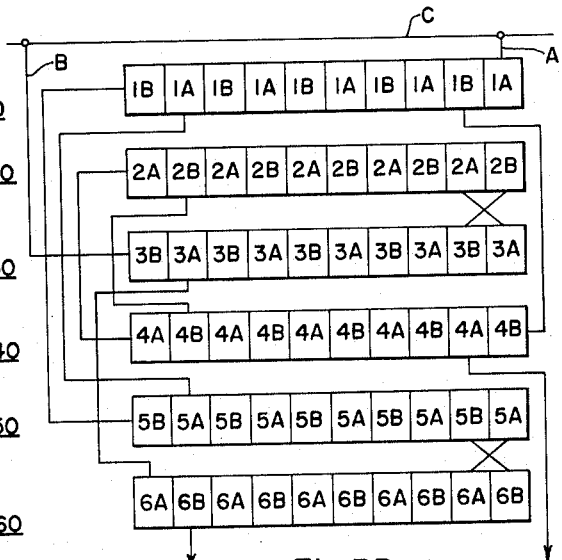
FIG. 3B is a transverse sectional view of a portion of an interleaved cylindrical pancake winding connected as shown schematically in FIG. 3A.

Referring to FIGURE 3B one may see that the conductors 1A, 2A, 3A, 4A, 5A, 6A, 1B, 2B, 3B, 4B, 5B and 6B which form the A and B circuits are interleaved throughout the windings. This desirable result may be achieved by winding each pancake with two conductors simultaneously before the inter-pancake connections are made.

In all embodiments of the invention the potential difference between adjacent turns in any of the pancakes is kept as small as possible. For example, in the third pancake 130 from the top in FIG. 3a it will be noted that the A circuit is fed from pancake 6 and the B circuit is fed from the line voltage. Consider that one unit of voltage is picked up by one circuit traversing a pancake. Now in the third pancake 130 from the top, the B circuit enters the pancake without traversing any other pancakes, hence we may consider this the zero voltage reference point. By the time the A circuit has reached the third pancake 130 it is already traversed the first pancake 110, the fifth pancake 150 and the sixth pancake 160. Hence, the A circuit may be considered to have three units of voltage as it enters pancake 3. The voltage difference between the A circuit and the B circuit at this point is now three units of voltage or the voltage of three series connected pancakes. A similar analysis holds for any other pancake in FIG. 3A.

It will, therefore, be apparent that there has been disclosed a cylindrical interleaved winding in which all pancakes are connected on the surfaces of the winding. No connections are required in the spaces between pancakes. The direction of conduction in all strands of a given pancake is the same.

Since numerous changes may be made in the above described apparatus and different embodiments may be made without departing from the spirit thereof, it is intended that all the matter described in the foregoing description or shown in the accompanying drawings shall be interpreted as illustrative and not in a limiting sense.

I claim as my invention:

An electrical winding comprising
a plurality of pancake coils,
each of said pancake coils including two radially interleaved conductors,
means interconnecting certain ends of the interleaved conductors of said pancake coils to provide first and second electrical circuits through the winding,
said means connecting each group of four pancake coils to direct the first electrical circuit sequentially through the first, second, fourth and third pancake coils of the group via one of the conductors of each pancake coil,
said means connecting each group of four pancake coils to direct the second electrical circuits sequentially through the second, first, third and fourth pancake coils of the group via the remaining conductor of each pancake coil,
the first and second electrical circuits traversing the first and fourth pancake coils of each group in a first direction, and the second and third pancake coils of each group in a direction opposite to the first direction.

References Cited by the Examiner

FOREIGN PATENTS 1,222,757    1/1960    France.
1,244,867    9/1960    France.
   99,508   10/1961    Holland.

LARAMIE E. ASKIN, *Primary Examiner.*

JOHN F. BURNS, *Examiner.*

T. J. KOZMA, *Assistant Examiner.*